UNITED STATES PATENT OFFICE.

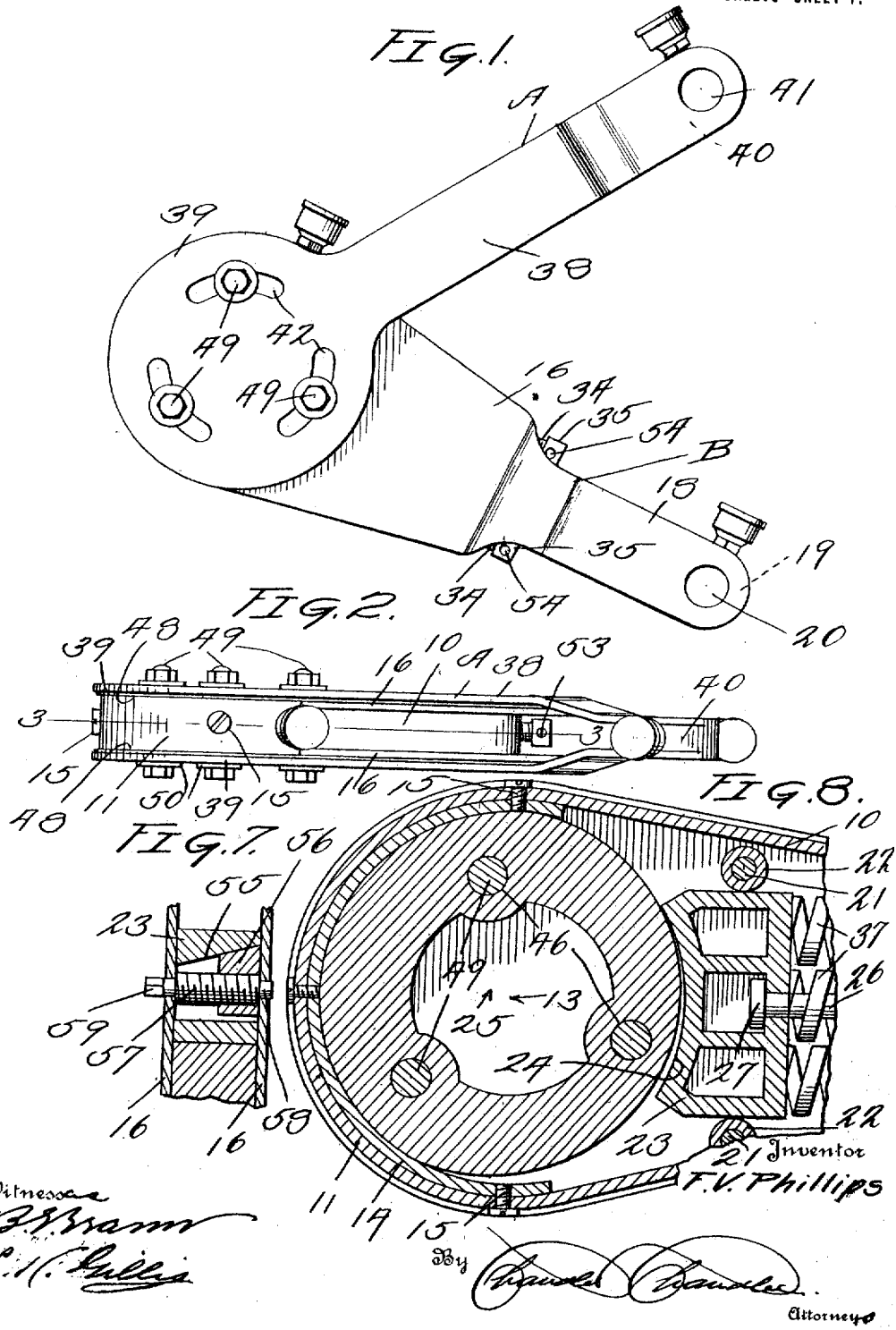

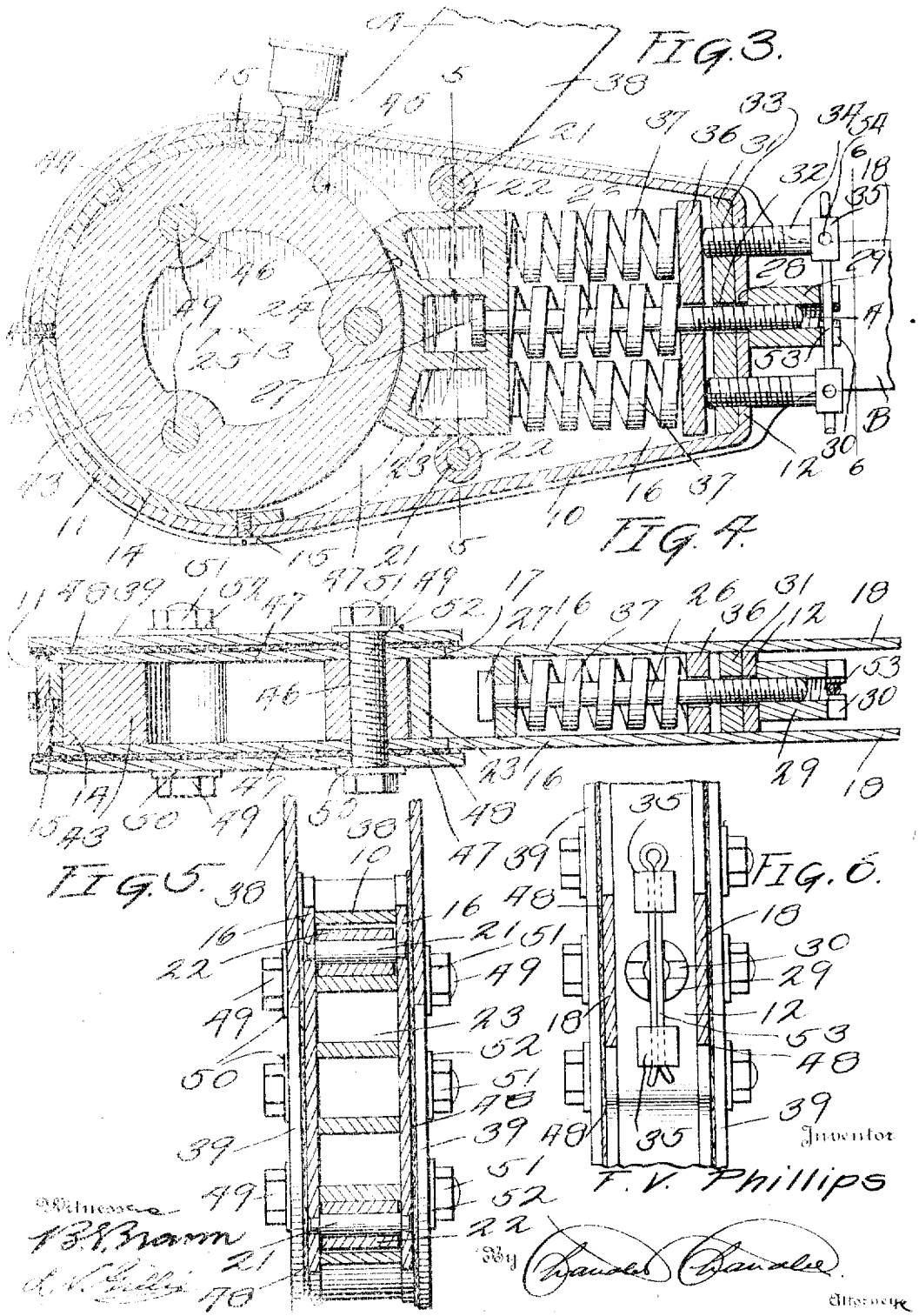

FRANCIS V. PHILLIPS, OF ORLANDO, FLORIDA.

FRICTIONAL SHOCK-ABSORBER.

1,255,788.

Specification of Letters Patent.

Patented Feb. 5, 1918.

Application filed June 23, 1916. Serial No. 105,424.

*To all whom it may concern:*

Be it known that I, FRANCIS V. PHILLIPS, a citizen of the United States, residing at Orlando, in the county of Orange, State of Florida, have invented certain new and useful Improvements in Frictional Shock-Absorbers; and I do hereby declare the following to be a full, clear, and exact description of the invention, such as will enable others skilled in the art to which it appertains to make and use the same.

This invention relates to shock absorbers and has special reference to a shock absorber of the friction type arranged to be used in connection with automobiles or other vehicles and designed to absorb shocks incident to the violent compressions and reactions of the springs of such vehicles.

The principal object of the invention is to provide an improved shock absorber of this class, the absorber being an improvement on that disclosed in the prior patent granted to me April 6, 1915, and bearing the Serial Number 1,134,223.

Experiment has disclosed that my shock absorber for which the said patent was granted did not fully and properly absorb the shocks incident to the reaction of the vehicle springs.

An important object of the present invention is to so improve the aforesaid shock absorber that both the shocks incident to compressions and the shocks incident to reactions will be more fully absorbed.

Experience has also shown that it is advisable to be able to regulate the extent to which the vehicle springs may be freely compressed and another important object of the invention is to so improve the foregoing shock absorber that the extent of such free compression may be varied at will.

A still further important object of the invention is to provide a shock absorber of the friction type wherein the friction elements will come into play at predetermined points on both the compression movement and the reaction movement of the vehicle springs, the points being easily regulated to lie equally, or unequally, on either side of the normal position of the vehicle springs.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of the improved shock absorber.

Fig. 2 is a plan view thereof.

Fig. 3 is a detail section on the line 3—3 of Fig. 2.

Fig. 4 is a detail section on the line 4—4 of Fig. 3.

Fig. 5 is a section on the line 5—5 of Fig. 3.

Fig. 6 is a section on the line 6—6 of Fig. 3.

Fig. 7 is a detail section through a modified form of adjusting means used herewith.

Fig. 8 is a view similar to Fig. 3 but showing one of the friction members adjusted to a different position.

In the embodiment of the invention herein illustrated the device is seen to consist of two arms indicated in general at A and B. The arm B comprises an elongated casing having side walls 10, a substantially semicircular end wall 11 and a second end wall 12. The end wall 11 is concentric with the pivotal center of movement of the two arms A and B, the center being indicated at 13 and within this end wall 11 is a liner 14 which is secured to said end wall by means of screws 15 so that the liner may be replaced if it becomes worn. As shown in Fig. 4 this liner 14 has its top and bottom edges spaced from the top and bottom edges of the end wall 11 respectively. Secured to the side walls 10 and the end wall 12 are cover plates 16 which have the ends opposite the wall 12 arcuately recessed to form with the upper and lower portions of the end wall 11 circular openings 17, said cover plates being set into the side walls 10 so that their outer surfaces are flush with the upper and lower edges of the end wall 11. The plates 16 have their ends opposite the arcuate wall 11 extended to form arms 18 which have their extremities connected by a thimble 19, the arms being provided with alined openings 20 corresponding to the opening in the thimble 19 so that a bolt may be passed therethrough for the purpose of attaching this arm to a portion of the spring or vehicle. Connecting the plates 16 adjacent the walls 10 are pins 21 which are surrounded between the plates by collars 22 which are preferably of leather or other like material. Between these collars 22 is positioned a slidable friction member 23 having an arcuate face 24, the arc being struck from a point 25 eccentric to the center 13. This friction block or member 23 is preferably hollow and extending through the wall opposite the arcuate face 24 is a bolt 26 provided with a head 27 which lies in the hollow portion of the block 23. This bolt passes through an opening 28 in the wall 12 and has on its outer end a nut 29 provided with intersecting screw driver kerfs 30 so that the position of the bolt 26 may be regulated by turning the nut 29 in one direction or the other and thus the head 27 caused to form a limit stop for the movement of the block 23 to or from the center 13, said stop being adjustable.

Resting against the wall 12 is a plate 31 having an opening 32 therein wherethrough passes the bolt 26. Moreover this plate 31 is provided with a pair of threaded openings 33 and bolts 34 pass through the wall 12 and are engaged in said threaded openings, these bolts being provided with the usual heads 35. Slidably mounted on the bolt 26 is a follower plate 36 and between this follower plate and the member 23 are arranged the coiled compression springs 37, two of these springs being alined with the respective bolts 34 while the third spring surrounds the bolt 26.

The member A consists of a pair of arms 38 having spaced ends 39 substantially circular in form and of the same radius as the outer radius of the wall 11 or preferably a little greater radius than the outer radius of said wall so as to overlap the wall 11 to practically the same extent as the plates 16 overlap the walls 10. These arms 38 are connected at the ends opposite the heads 39 by a thimble 40 and through this thimble and the arms extends an opening 41 for the reception of a bolt by means of which the device may be attached to the vehicle or springs. Each of the heads 39 is provided with a series of spaced arcuate slots 42 which are concentric with the heads and thus are concentric with the center 13, the heads being concentric with its center. The heads 39 thus fit over the arcuate portions 17 of the cover plate 16 and form closures for the openings of the semi-circular end of the casing formed by the arm B.

Mounted between the heads 39 is a friction disk 43. Substantially one-half of the periphery of this disk forms a circular arc 44 struck from the center 13, and this portion of the disk lies against the inner surface of the liner. The remaining portion of the periphery of said disk forms a second substantially circular arc 45 struck from the center 25, and this portion 45 thus constitutes a cam surface, the ends of which are more remote from the center 13 than is the central portion. By this means the revolution of the disk about the center 13 causes the portion 45 to approach or recede from the wall 12.

Under the usual circumstances of adjustment the head 23 is so adjusted by the bolt 26 that this head lies in slightly spaced relation to the surface 45 and under these circumstances movement of the disk 43 in either direction will cause engagement of the periphery 45 with the head 23, this engagement moving the head 23 toward the wall 12 as the disk is rotated after the first contact of the disk with said head. By this means the springs 37 are gradually compressed and consequently the friction between the disk 43 and head 23 increases as the movement of the disk 43 increases.

This disk 43 is provided with a series of spaced and threaded bolt openings 46, the centers of said openings being concentric to the centers 13. Furthermore, the thickness of the disk 43 is slightly greater than the corresponding dimension of the liner 14 so that the periphery of the disk 43 will slightly overlap the upper and lower edges of said liner. On each side of the disk 43 is a plate 47 which is of such thickness that the combined thicknesses of the two plates 47 and 43 are slightly greater than the corresponding dimension of the wall 11. These plates 47 fit between said wall 11 and the arcuate ends of the cover plates 16. Between each of the plates 47 and the heads 39 is a felt washer 48 of substantially the same diameter as the diameter of said heads 39. The washers 48 and plates 47 are provided with openings registering with the threaded openings 46, these latter also registering with the slots 42 in the heads 39. Through the openings thus formed pass the bolts 49 which are threaded into the disk 43 these bolts being with washers 50 beneath the heads. By means of this arrangement and by reason of the fact that there is extra clearance between the upper and lower edges of the wall 11 and the heads 39 over that between the plates 47 and heads 39 the felt disk on one side can be compressed so tightly that there will be no slipping of the bolts 49 in the slots 42. In order to effect the same compression on the other side the bolts are provided with nuts 51 and washers 52.

By this means the disk 43 may be firmly connected to the heads 39 without interfering with the movement of the latter pivotally of the member B. At the same time it will be noted that the engagement between the felt washers 48 and the wall 11 and plate 16 prevents any dust from obtaining access to the working parts of the device.

It will now be plain that as the extremities of the members A and B approach each other the disk 43 will be rotated on the pivotal axis 13 until a portion of the periphery 45 comes in contact with the head 23. These arms A and B, upon further approach toward each other will cause frictional movement of the disk 43 past the head 23 and the friction will gradually increase owing to the shape of such disk until finally the shock incident to the movement of the arms of the members A and B toward each other will be absorbed. Upon the reaction of the springs so that these arms A and B move away from each other the disk 43 will first move to disengage the periphery 45 from the head 23 and upon further movement of said arms away from each other the other half of the periphery 45 will become engaged with the head 23 and will thus check the reactionary shock. The purpose in adjusting the head 23 in slightly spaced relation to the disk 43 when the latter is in its normal or central position is to permit free action of the springs of the vehicle to a limited extent and it will be obvious that the farther from the center 13 is the head 23 adjusted the greater movement of the arms A and B toward and from each other without engagement of the disk 43 with such head.

Moreover, as shown in Fig. 8 the bolts 49 may be adjusted in the slots 42 so that, in place of the arcuate surface 45 being normally centrally disposed of the head 23 this arcuate surface will have its center disposed to one side or the other of said head 23. By this means the frictional absorption of the shock due to moving the members A and B toward each other may be made to act with less or greater movement from the normal than the frictional absorption of the shock due to said members moving apart.

By properly adjusting the bolts 34 the tension on the springs 37 may also be regulated so that a greater or less degree of friction may be employed in accordance with the weight of the car and occupants or other conditions in the operation of the machine.

In order to hold the bolts 34 and nuts 29 in adjustment there is preferably provided a cotter pin 53 which passes through suitable openings 54 formed in the head 35 and through one of the screw driver kerfs of the nut 29.

In place of utilizing a bolt 26 for the purpose of adjusting the position of the head 23 in its forward limit of movement the device shown in Fig. 7 may be used. In this form of the adjustment the hollow head 23 is provided with a beveled wall 55 adjacent the wall 12 and against the beveled face of this wall rests a beveled face nut 56 which is carried on a screw 57 provided with journal ends 58 engaged in the plates 16. Moreover, the screw 57 has a polygonal head 59 for the reception of a suitable wrench so that this screw may be rotated. When the screw is rotated in one direction the nut 56 will be drawn in a corresponding direction and thus the head 55 moved toward or permitted to move from the wall 12, in accordance with the direction of rotation of said screw.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new is:—

1. A shock absorber comprising two pivotally connected members, a friction element carried by one of said members and movable toward and from the pivotal center of said members, means to limit the movement of the element toward the center, means to adjust said limiting means, a friction disk carried by the other member and engageable with the element at two predetermined points in the relative movement of said members, said points being determined by the adjustment of the limiting means.

2. A shock absorber comprising two pivotally connected members, a friction element carried by one of said members and movable toward and from the pivotal center of said members, means to limit the movement of the element toward the center, means to adjust the limiting means, a friction disk carried by the other member and having a portion of its periphery forming an arc eccentric to the pivotal center, said disk being engageable by the element at two points on opposite sides of a line passing through the pivotal center and the center of the eccentric arc, said points being determined by the adjustment of the limiting means.

3. A shock absorber comprising two pivotally connected members, a friction element carried by one of said members and movable toward and from the pivotal center of said members, means to limit the movement of the element toward the center, means to adjust the limiting means, a friction disk carried by the other member and having a portion of its periphery forming an arc eccentric to the pivotal center, means to adjust the friction disk about the pivotal center, said disk being engageable by the element at two points on opposite sides of a line passing through the pivotal center and the center of the eccentric arc, said points being determined by the adjustment of the limiting means, and the adjustment of the disk about the pivotal center.

In testimony whereof, I affix my signature, in the presence of two witnesses.

FRANCIS V. PHILLIPS.

Witnesses:
 GEO. W. CHANDLEE,
 PHILIP F. LARNER.